Aug. 21, 1962     C. C. WALES     3,050,022
CONTINUOUS METHOD OF MAKING PIPE
Filed March 18, 1960
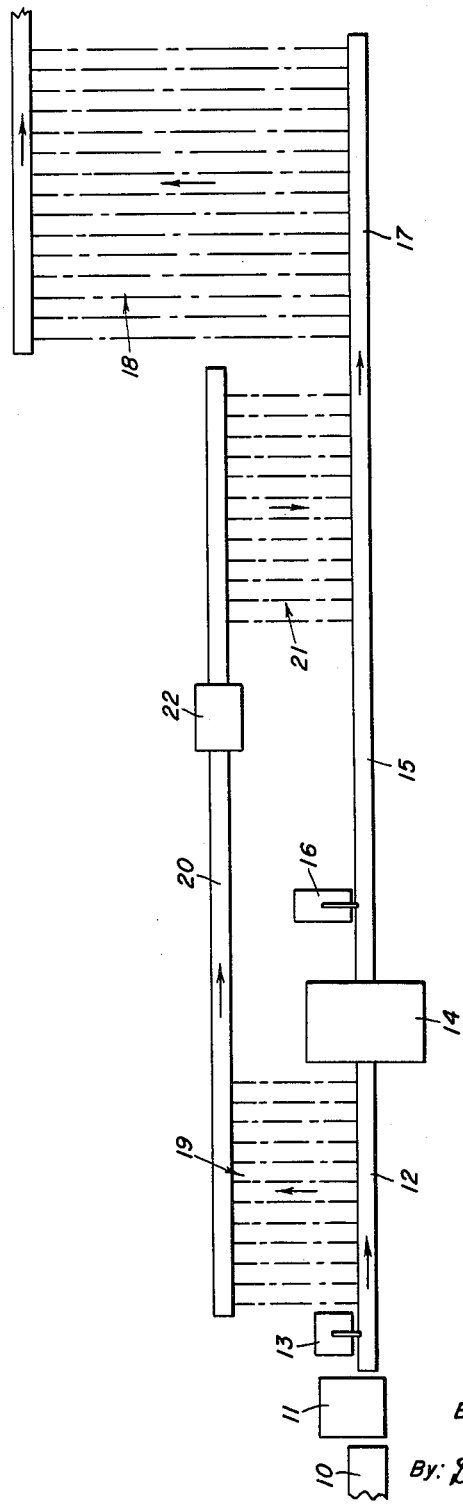
INVENTOR
CHARLES C. WALES
deceased
By: GLADYS C. WALES
executrix
By: Donald G. Dalton
Attorney

3,050,022
CONTINUOUS METHOD OF MAKING PIPE

Charles C. Wales, deceased, late of Bay Village, Ohio, by Gladys C. Wales, executrix, Bay Village, Ohio, assignor to United States Steel Corporation, a corporation of New Jersey Filed Mar. 18, 1960, Ser. No. 15,873
2 Claims. (Cl. 113—33)

This invention relates to a method of making metal pipe continuously and, in particular, to an improvement in the butt-weld method, by which fullest advantage may be taken of the possibility of continuous operation thereof.

The manufacture of pipe by the so-called continuous butt-weld method (i.e., continuous reheating furnace, forming and welding mill and stretch-reduction mill) is now well established. The operation of a conventional butt-weld line, however, is continuous only in theory. Production must be interrupted to thread a different size of skelp through the furnace or to remove or change rolls in the reduction mill when a change in the size of product is necessary or when the rolls require redressing. As a result, down time mounts up and the overall production efficiency of the installation is held down to a value of 75% or less. I have invented a method whereby such interruptions to operation may be minimized or eliminated, thus permitting the mill to achieve substantially actual continuous production with a great increase in efficiency.

In a preferred practice of my method, I employ the same skelp for making a product in a wide range of sizes. This presents a problem in that the delivery speed of the smallest-sized product will be many times greater than the delivery speed of the largest-sized product. According to the invention I cut the smallest-sized product into cooling-bed lengths and accelerate them successively to provide a time interval therebetween, advancing them constantly in the same direction toward a cooling bed. In that interval, I kick off one length from the cooling-bed run-in conveyor before the next length enters the latter, into a skidding trough adjacent the conveyor, in which it is decelerated to rest by friction. In the same interval I kick off from the trough onto the cooling bed the length previously kicked off from the conveyor to the trough and brought to rest therein. I further provide intervals for making necessary changes in the rolls of the reduction mill by cutting the product of maximum size into finished lengths before it enters the reduction mill. I divert such lengths laterally of the reduction mill, move them past the latter and then return them to the path of the smallest-sized product and feed them into the cooling-bed run-in conveyor.

When making pipe of the smaller sizes, the problem of arresting successive cooling-bed lengths before delivery to the cooling bed is aggravated by the fact that the coefficient of friction effective to decelerate the skidding lengths is even lower than that by which the rollers of the conveyor accelerate the lengths to provide a time interval between them. The required skidding distance varies as the square of the speed.

A complete understanding of the invention may be obtained from the following detailed description and explanation which refer to the accompanying drawing, the single figure of which is a diagrammatic plan view of a mill installation for carrying out my improved method.

A continuous furnace 10 delivers skelp at welding temperature to a forming and welding mill 11 comprising seven stands. The skelp is of the width and thickness suitable for making pipe of the largest in the range of pipe sizes contemplated. Pipe is delivered from mill 11 onto a run-out conveyor 12. A traveling hot saw 13 is located at the entering end of conveyor 12 but is ordinarily not in operation.

When pipe of any size smaller than the largest size of the range is to be produced, the product of mill 11 is fed by conveyor 12 continuously to a multi-stand reduction mill 14, including eighteen stands, for example. The number of these stands in operation at any time is determined by the size of finished product being made. Whatever the size, the product is delivered from mill 14 onto a run-out conveyor 15 and is cut into cooling-bed lengths by a flying hot saw 16. These lengths are accelerated as soon as they are cut, by driving the rollers of conveyor 15 at suitable speed, in order to achieve a clearance between the trailing end of one length and the leading end of the next before the latter reaches the run-in conveyor 17 of a cooling bed 18. This clearance affords a brief interval in which one length may be kicked off from the conveyor into a skidding trough and another length from the trough onto the bed before the arrival of the leading end of the next length on conveyor 17.

When it becomes necessary to change rolls in the stands of mills 14 or the number of stands operating or to change the blade of saw 16, I operate saw 13 to cut the product of mill 11 into finished lengths, then accelerate successive lengths on conveyor 12 and discharge them laterally therefrom onto a transfer table 19. From table 19, the product moves onto a by-pass conveyor 20 which carries it longitudinally and constantly in the same direction in a path parallel to conveyor 15 and through a sizing mill 22. Just before reaching the area of bed 18, pipe on conveyor 20 is discharged onto a transfer table 21 which restores it to the original line of travel by placing it on conveyor 15. The latter delivers finished lengths of pipe of the largest size to conveyor 17 from which it is kicked off onto the skidding trough adjacent bed 18.

It will be apparent from the foregoing that once the operation is started, it is not necessary to stop the skelp traveling through furnace 10 and mill 11 for changes in the size of product being made. While the required changes are being made in mill 14, mill 11 continues to deliver product of the maximum size which does not have to go through mill 14 and is diverted around it and the flying saw to the cooling bed. Mill 11 operates at relatively low speed and removal of its rolls is necessary only infrequently. Its operation is not interrupted by the necessity for changes in mill 14.

Although I have disclosed herein the preferred embodiment of my invention, I intend to cover as well any change or modification therein which may be made without departing from the spirit and scope of the invention.

I claim:

1. A method of making pipe in a range of sizes which consists in constantly feeding skelp heated to welding temperature in a straight-line path through a butt-weld mill thereby converting it to continuous pipe of the maximum size of said range, feeding said pipe along the line of said path through a multi-stand reducing mill thereby converting it to pipe of smaller size, cutting said smaller-sized pipe into cooling-bed lengths as it issues from said reducing mill, accelerating said lengths successively to provide kick-off intervals therebetween, advancing said lengths constantly in the same direction to a cooling-bed run-in conveyor alined with said straight-line path, and providing intervals for changing the roll stands of said reducing mill by cutting said pipe of maximum size into finished lengths, accelerating them successively and translating them laterally away from said straight-line path before they reach said reducing mill, then feeding said finished lengths longitudinally, next translating said finished lengths laterally back to the line of said straight-line path and finally delivering them to said conveyor.

2. A method of making pipe in a range of sizes which consists in constantly feeding skelp heated to welding temperature in a straight-line path through a butt-weld mill thereby converting it to continuous pipe of the maximum size of said range, feeding said pipe along the line of said path directly to and through a multi-stand reducing mill thereby converting it to pipe of smaller size, cutting said smaller-sized pipe into cooling-bed lengths as it issues from said reducing mill, accelerating said lengths successively to provide kick-off intervals therebetween, advancing said lengths constantly in the same direction to a cooling-bed run-in conveyor aligned with said straight-line path, and providing intervals for changing the roll stands of said reducing mill by cutting said pipe of maximum size into finished lengths, moving said finished lengths of maximum size from said straight-line path past said reducing mill, thereafter moving said finished lengths back onto said straight-line path and finally delivering them to said conveyor.

References Cited in the file of this patent
UNITED STATES PATENTS

| | | |
|---|---|---|
| 1,830,760 | Johnson | Nov. 10, 1931 |
| 1,968,455 | Jones | July 31, 1934 |
| 1,970,570 | Littler et al. | Aug. 21, 1934 |
| 2,024,485 | Sussman | Dec. 17, 1935 |
| 2,063,689 | Littler | Dec. 8, 1936 |
| 2,959,849 | Rubin | Nov. 15, 1960 |